| United States Patent [19] | [11] | 4,328,144 |
|---|---|---|
| Woo | [45] | May 4, 1982 |

[54] ROOM TEMPERATURE CURE LATICES

[75] Inventor: James T. K. Woo, Medina, Ohio

[73] Assignee: SCM Corporation, New York, N.Y.

[21] Appl. No.: 131,166

[22] Filed: Mar. 17, 1980

[51] Int. Cl.$^3$ .................... C08L 33/08; C08L 33/10; C08L 61/00; C08L 75/04

[52] U.S. Cl. .................... 523/408; 525/107; 525/108; 525/118; 525/281; 523/410; 523/411; 524/507; 524/510; 524/513; 524/521

[58] Field of Search .................... 260/29.4 R, 29.2 N, 260/29.2 EP, 29.2 TN, 29.6 NR, 29.3, 29.2 E, 29.6 RB; 528/307, 312

[56] References Cited

U.S. PATENT DOCUMENTS 4,037,018  7/1977  McGinniss .................... 260/29.2 N

*Primary Examiner*—Allan Lieberman
*Attorney, Agent, or Firm*—Thomas M. Schmitz

[57] ABSTRACT

Room temperature curable latices can be produced by copolymerizing ketimine derivative ethylenically unsaturated monomers with conventional ethylenically unsaturated monomers in an emulsion process at a controlled pH greater than about 7.2 to produce a coagulum-free latex containing blocked amine ($-NH_2$) groups. In use, the pH of the latex can be adjusted to acidic below 7 to generate unblocked reactive amino groups which can be cured or cross-linked at about room temperature with water-dispersed polymers such as epoxy, double bond or isothiocyanate containing polymers.

7 Claims, No Drawings

ROOM TEMPERATURE CURE LATICES

BACKGROUND OF THE INVENTION

This invention pertains to water-dispersed polymers wherein amine functionality is generated in use to cross-link with reactive matrix polymers to form a cured cross-linked protective coating.

Amine functionalities are desirable in polymers for various reasons. Amine groups co-react with functionalities such as epoxide, isocyanate, isothiocyanate, double bond, etc., at room temperature. Room temperature cure of water-dispersed polymers is highly desirable by reason that environmentally undesirable solvents are avoided as well as energy sensitive heat curing processes are not necessary. Further, amine functional polymers frequently improve coating properties. When an emulsion polymerization is carried out using styrene, butyl acrylate and 2-amino ethyl methacrylate hydrochloride (2-AEM), it is found that about 95% of the amino-containing monomer polymerizes in the aqueous phase, and only the remaining 5% copolymerizes with styrene and butyl acrylate. However, this is not desirable for curing reasons. The small amount of homopolymer of 2-AEM will cure poorly. In order to have a good cure, the amino functionalities should be randomly distributed throughout the copolymer.

It now has been found that water-dispersed polymers with random distribution of amino functionalities can be prepared with an emulsion technique. This is achieved by blocking the amine with a ketone or aldehyde to form a ketimine and then co-polymerizing the ketimine monomers in an emulsion process at a controlled pH higher than about 7.2. At the high pH, the ketimine monomers and particularly the amino ($-NH_2$) groups remain blocked to produce ketimine polymers useful later as cross-linker components in water-dispersed coatings. In use, the ketimine emulsion polymer is adjusted with acid to lower the pH below about 7 whereby amino ($-NH_2$) groups on the ketimine polymer become unblocked and then become co-reactive with water-dispersed matrix polymers such as epoxy polymer, double bond polymer, or isothiocyanate containing polymer. The matrix polymer and the ketimine cross-linker polymers provide a surface coating composition which can be cured or cross-linked at ambient temperatures or temperatures not substantially above room temperature.

SUMMARY OF THE INVENTION

Briefly, the invention pertains to water-dispersed and room temperature cure polymers which can be produced by first reacting a ketone or aldehyde with an aliphatic amino to produce a ketimine, and then reacting the ketimine derivatives with vinyl, acrylate, or methacrylate to produce ketimine reactive monomers. The ketimine monomers are then co-polymerized with ethylenic monomers in an emulsion process at a controlled pH higher than about 7.2. At the high pH, the ketimine monomers and particularly the amino ($-NH_2$) groups remain blocked to produce blocked ketimine polymers useful as cross-linker components. In use, the ketimine emulsion polymer is mixed with a reactive matrix polymer. The ketimine emulsion polymer mixture is adjusted with acid to lower the pH below about 7 whereby amino ($-NH_2$) on the ketimine polymer become unblocked and co-reactive with water-dispersed matrix polymers such as epoxy, or double bond polymer or isothiocyanate containing polymer. The matrix polymer and the ketimine cross-linker polymers provide a surface coating composition which becomes cured or cross-linked at ambient temperatures or temperatures not substantially above room temperature.

DETAILED DESCRIPTION OF THE INVENTION

The process and composition of this invention pertain to the emulsion copolymerization of ketimine unsaturated monomers with other conventional ethylenically unsaturated monomers to produce a blocked ketimine derivative adapted to cross-link with matrix polymers.

Ketimine unsaturated monomers can be produced by first reacting a ketone or aldehyde with an aliphatic amino compound selected from primary amines, diamines, or ethanolamines to produce a ketimine. The ketimine can be further reacted with an ethylenic derivative containing an ethylenically unsaturated group selected from an acrylic, methacrylic, or vinyl group. A ketimine unsaturated monomer can be generally depicted as follows:

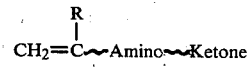

The ketimine can also be prepared by reacting an amino-containing monomer with ketones or aldehydes. The preparation of ketimine monomers is further illustrated in the examples.

The amine structure of the ketimine monomer can be derived from primary amines and can include, for example, methylamine, ethylamine, n-propylamine, isopropylamine, n-butylamine, isobutylamine, n-anylamine, isoamylamine, n-octylamine, n-decylamine, alurylamine, cetylamine, stearylamine, and similar aliphatic primary alkyl amines as well as diamines such as ethylenediamines, tetramethylenediamine, and hexamethylenediamine, or thanolamines. Particularly desirable aliphatic amines include diethylene triamine, triethylene tetramine, tetraethylenepentamine and the like. Aromatic amine such as amino benzene can also be used. The aliphatic amines can be reacted with ketones to produce ketimines.

The ketone structure of the ketimine monomer can include, for example, acetone, methyl ethyl ketone, diethyl ketone, methyl-n-propyl ketone, ethyl-n-propyl ketone, methyl-n-butyl ketone, methyl isobutyl ketone, ethyl-n-butyl ketone, di-n-propyl ketone, diisopropyl ketone, diisobutyl ketone, and similar dialkyl or mixed alkyl ketones. The foregoing amines and ketones can be co-reacted to produce a ketimine suitable for co-reacting with an unsaturated monomer as hereinafter described.

Ethylenically unsaturated derivatives suitable for co-reaction with a ketimine to produce an unsaturated ketimine monomer can include acrylic, methacrylic, or vinyl derivatives containing reactive chains such as glycidyl or epoxy groups or isocyanate groups which co-react with the amine of hydroxy structure of the ketimine. Suitable glycidyl derivatives include glycidyl methacrylate, allyl glycidyl ether, and glycidyl acrylate. Suitable epoxides can be produced by reacting an acrylic or methacrylic acid with a small chain diepoxide such as digylcidyl ether of bisphenol-A. The epoxide containing monomer is then reacted with the ketimine to produce a ketimine unsaturated monomer. Similarly, isocyanate containing monomer such as vinyl isocyanate, allyl isocyanate, 2-isocyanato ethyl methacrylate, styryl isocyanate, etc., can be reacted with ketimine to produce an unsaturated ketimine monomer.

Unsaturated ketimine monomers can contain on a weight basis between about 5% and 50% amino chain, 10% and 40% ketone chain, and 20% and 60% acrylic, methacrylic or vinyl chain. The preparation of such monomers are more specifically illustrated in the examples.

In accordance with this invention, unsaturated ketimine monomers are copolymerized with conventional ethylenic monomers in an emulsion polymerization process controlled at a pH greater than about 7.2 wherein useful conventional ethylenically unsaturated monomers can include, for example, lower alkyl esters of acrylic or methacrylic acid such as methyl-, ethyl-propyl-, butyl-acrylates or methacrylates, 2-methylhexyl acrylate, n-octyl acrylate, 2-ethylhexyl acrylate, as well as similar methacrylates. Other ethylenic monomers include vinyl aromatic hydrocarbons such as styrene, alphamethyl styrene, similar alkyl styrene, vinyl toluene, vinyl naphtalene, and divinyl benzene; aliphatic hydrocarbons such as 1,3 butadiene, methyl butadiene, 1,3 piperylene, cyclopentadiene, 2,3-dimethyl butadiene, and similar conjugated polyolefins; vinyl halides such as vinyl chloride and vinylidene chloride; and vinyl esters such as vinyl acetate. Particularly preferred ethylenically unsaturated monomers include alkyl acrylates and methacrylates with minor amounts of styrene, alpha-methyl styrene, t-butyl styrene, 1,3-butadiene, isoprene, and acrylonitrile.

In accordance with the process of this invention, the ketimine monomer and the ethylenic monomers are polymerized in an aqueous emulsion polymerization medium at a pH above 7.2 so that the ketimine monomer polymerizes in the oil phase of the emulsion. At a pH less than 7, the ketimine monomers undergo hydrolysis causing undesirable instability, gellation and coagulum. The latex produced in accordance with this invention at a pH above 7.2 contains blocked amino (—NH$_2$) groups. Both the ketimine monomer and the ethylenic monomers can be fed continuously or intermittenly to an aqueous polymerization medium to be co-polymerized in a conventional emulsion polymerization process. The polymerization process can utilize catalysts, surfactants, buffer and the like to polymerize the monomers at temperatures between about 40° C. and 100° C. and usually around 75° C. to 90° C. Catalysts or initiators include free radical catalysts, such as hydrogen peroxide, sodium, potassium or ammonium persulfates, perborates and like polymerization catalysts. Initiators such as benzoyl peroxide, acetyl peroxide, lauryl peroxide, acetone peroxide, cumene peroxide can be used at 0.1% o 2% by weight based on monomers. Suitable surfactants include anionic, non-anionic, and cationic surfactants such as alkyl carboxylic acid salts, alkyl sulfate salts, alkyl sulfonate salts, alkyl phosphate salts. Emulsifying agents are ordinarily soaps such as alkylbenzenesulfonates such as sodium dodecyl benzene sulfonate, alkyl phenoxyl polyethylene sulfonates, sodium lauryl sulfate and similar soaps.

In use, the ketimine derivative polymers are particularly suitable for crosslinking reactive matrix polymers by adjusting the pH with minor amounts of acid to lower the pH to below 7 and preferably below about 6. The acidic pH functions to unblock the amino (—NH$_2$) groups and thereby generate reactive —NH$_2$ groups for crosslinking co-reactive matrix polymers. A particular advantageous aspect of this invention is that the polymer mixtures of ketimine polymer cross-linker and reactive matrix can be cured at ambient room temperatures. Useful co-reactive water soluble matrix polymers can include, for example, polyesters, polyurethanes, epoxy, phenolic and similar polymers containing reactive epoxy or double bonds, or isothiocyanate groups co-reactive with the ketimine polymer free amino (—NH$_2$) groups. The room temperature cure composition comprising a ketimine cross-linking polymer and a co-reactive matrix polymer can be produced and cured according to the following process steps:

(a) Reacting a ketimine monomer with ethylenically unsaturated monomers in a latex polymerization process at a pH greater than about 7.2 to produce cross-linking ketimine emulsion polymer containing blocked amino groups;

(b) Mixing the cross-linking ketimine polymer with a co-reactive matrix polymer to form a latex mixture having a pH greater than about 7.2;

(c) Adjusting the pH to less than 7 to unblock the blocked amino groups on the cross-linking ketimine polymer and generate reactive amino groups adapted to cross-link with water dispersed reactive matrix polymers; and, (d) Curing a surface coating composition at temperatures not substantially above room temperature by cross-linking the ketimine polymer amino groups with the matrix polymer reactive groups such as epoxy or isothicyanate groups to produce a cured cross-linked protective coating.

The merits of this invention will become more apparent and are further illustrated in the following examples.

EXAMPLE 1

A. Preparation of ketimine monomer

An ethylenically unsaturated ketimine monomer was produced by first reacting 393 gm. (3.8 moles) of diethylene triamine and 900 gm. (9 moles) of methyl isobutyl ketone (MIBK) which were charged into a 3-liter 4-necked round bottom flask. Through the necks were fitted a mechanical stirrer, a thermometer, a nitrogen inlet and a Dean-Starp trap-condenser combination. 1.5 ml. of glacial acetic acid was added to the reaction mixture which was heated to reflux temperature and water removed from the azeotrope of water-MIBK. After 138 gm. of water was removed, the reaction was stopped and the ketimine remained. A ketimine monomer was prepared by reacting glycidyl methacrylate with the ketimine derivative as follows. About 845 gm. (3.16 mole) of the ketimine derivative was charged into a 3-liter round bottom flask equipped with N$_2$ inlet, condenser, mechanical stirrer and a thermometer. After the ketimine derivative was heated to 80° C., about 450 gm (3.17 mole) of glycidyl methacrylate with 0.23 gm. of phenothiazine was slowly added to the ketimine over a period of about 3 hours. The reaction mixture was held another 3 hours at 80° C. to produce a ketimine monomer (A).

B. Preparation of ketimine polymer.

A ketimine cross-linking polymer was produced by reacting the ketimine monomer (A) ethylenically unsaturated monomers butyl acrylate (BA) and methyl methacrylate (MMA) according to the following:

|     |                   |         |     |
| --- | ----------------- | ------- | --- |
| (i) | D.I. - H$_2$O     | 684.00  | gm. |
|     | KX-4              | 2.8     | gm. |
|     | NaOH              | 0.52    | gm. |
|     | NaHCO$_3$         | 1.48    | gm. |
| (ii)| BA                | 6.6     | gm. |
|     | MMA               | 4.2     | gm. |
| (iii)| K$_2$S$_2$O$_8$  | 1.6     | gm. |
|     | D.I. - H$_2$O     | 48.00   | gm. |
| (iv)| BA                | 213.4   | gm. |
|     | MMA               | 135.8   | gm. |
|     | Ketimine Momoner (A) | 40.00 | gm. |
|     | CHCl$_3$          | 2.00    | gm. |
| (v) | K$_2$S$_2$O$_8$   | 0.8     | gm. |
|     | D.I. - H$_2$O     | 24.00   | gm. |
| (vi)| Formapon          | 0.04    | gm. |
|     | D.I. - H$_2$O     | 4.00    | gm. |

A ketimine latex polymer was produced wherein (i) was charged into a standard latex preparation flask and the contents heated to 75° C. A 3% heel (ii) was charged into the flask next, followed by (iii). The monomer feed (iv) was then fed continuously into the reaction vessel while the temperature of the reaction was held at 75° C. The pH at the start of the polymerization was 9.84. After an hour of monomer addition, the pH was 7.38, whereupon (v) was added and the monomer feed continued. About 0.5 gm. NaHCO$_3$ in 5 gm. of water was added along with (vi). The pH at that time was 7.25. The latex was let cool and filtered. The latex contained 2.996 grit; N.V. of latex was 14.4% theoretical N.V. was 21.8%.

EXAMPLE 2

Similar to the latex processing in Example 1, a ketimine cross-linking polymer was produced from the ketimine monomer in Example 1 (A) as follows:

|     |                   |         |     |
| --- | ----------------- | ------- | --- |
| (i) | D.I.(deionized) - H$_2$O | 680.3 | gm. |
|     | KX - 4(thiophenyl oligomer surfactant) | 2.8 | gm. |
|     | Na                | 0.5     | gm. |
|     | NaHCO$_3$         | 1.5     | gm. |
| (ii)| BA                | 6.6     | gm. |
|     | MMA               | 4.2     | gm. |
| (iii)| K$_2$S$_2$O$_8$  | 1.6     | gm. |
|     | D.I. - H$_2$O     | 48.00   | gm. |
| (iv)| BA                | 213.4   | gm. |
|     | MMA               | 135.8   | gm. |
|     | Ketimine Monomer (A) | 40.0 | gm. |
| (v) | K$_2$S$_2$O$_8$   | 0.8     | gm. |
|     | D.I. - H$_2$O     | 24.0    | gm. |
| (vi)| Formapon(sodium sulfoxylate formaldehyde) | 0.04 | gm. |
|     | D.I. - H$_2$O     | 4.0     | gm. |

The ketimine polymer was produced charging (i) and (ii) into the reaction vessel and heated about 75° C. Thereafter, (iii) was added followed by the monomer feed (iv) added continuously. The reaction mixture pH was about 8.1, although the pH did vary from time to time between 8.1 and 9.5. After about 4 hours, the monomer feed was concluded whereupon (v) and (vi) were added. The batch was thereafter held for further polymerization at a pH of about 8. The resulting latex was stable, indicating no hydrolysis of the ketimine monomer (A) during the latex polymerization process.

EXAMPLE 3

Similar to Examples 1 and 2, a ketimine cross-linking polymer was produced as follows:

|     |                   |         |     |
| --- | ----------------- | ------- | --- |
| (i) | D.I. - H$_2$O     | 703.6   | gm. |
|     | KX - 4            | 2.8     | gm. |
|     | NaOH              | 0.5     | gm. |
|     | NaHCO$_3$         | 1.5     | gm. |
| (ii)| BA                | 7.3     | gm. |
|     | MMA               | 4.7     | gm. |
|     | AIBN              | 0.04    | gm. |
| (iii)| K$_2$S$_2$O$_8$  | 0.4     | gm. |
|     | D.I. H$_2$O       | 48.0    | gm. |
| (iv)| BA                | 118.6   | gm. |
|     | MMA               | 75.4    | gm. |
|     | Ketimine Monomer (A) | —    | gm. |
|     | AIBN              | 0.8     | gm. |
| (v) | BA                | 94.1    | gm. |
|     | MMA               | 59.9    | gm. |
|     | Ketimine Monomer (A) | 40.00 | gm. |
|     | AIBN              | 0.8     | gm. |
| (vi)| Formapon          | 0.04    | gm. |
|     | D.I. - H$_2$O     | 4.00    | gm. |

Similarly, to Examples 1 and 2, a stable latex was prepared. At all times during latex polymerization, the pH was above 8.1 and the pH at the end of the latex preparation was 9.0. The latex of this example was then mixed with 10 weight parts melamine acrylate to 100 weight parts latex. The pH of the resultant mixture was adjusted with 0.1 N NCl to a pH of 4 whereupon the mixture was applied to a substrate to form a protective surface coating. The film cured at room temperature within several minutes.

In a similar manner, about 100 weight parts of the latex of this example was mixed with about 30 weight of a polyisothiocyanate solution which was prepared by reacting potassium isothiocyanate with half aminated polychloromethyl butadiene. The latex and polyisothiocyanate mixture was adjusted with 0.1 N HCL to a pH of 4, whereupon the mixture was applied as a film substrate. The wet film cured at room temperature within about 10 minutes to produce an excellent protective paint film.

EXAMPLE 4

In a manner similar to Example 1, a ketimine monomer was produced by reacting glycidyl methacrylate with the ketimine synthesized in Example 1 (A) by reacting 2-isocyanatoethyl methacrylate with the kitimine derivative using dibutyldilaurate as a catalyst. The reaction was carried out about 50° C. and was continued until completion indicated by the absence of isocyanate measured by infrared spectrum.

The ketimine monomer was thereafter polymerized in a latex process with ethylenic monomers to produce a cross-linking ketimine polymer useful for crosslinking co-reactive matrix polymers contained in protective surface coatings.

EXAMPLE 5

In a manner similar to Example 1, a ketimine monomer was produced except monoethanolamine was reacted with methyl isobutyl ketone to form a ketimine derivative useful for preparing a ketimine monomer which was then co-polymerized with ethylenically unsaturated monomers in a latex process to produce a ketimine cross-linker polymer.

The foregoing examples are not intended to be limiting except as defined in the appended claims.

I claim:

1. In a process for producing aqueous coating composition adapted to cure at low temperatures proximate to room temperatures containing water-dispersed polymers the improved process steps comprising:

provide a ketimine ethylenically unsaturated monomer containing blocked amine groups;

copolymerizing said ketimine ethylenically unsaturated monomer with ethylenically unsaturated monomers in an emulsion process at a pH greater than a pH of 7.2 to produce a stabilized blocked ketimine polymer containing blocked amine groups;

mixing said blocked ketimine polymer with a reactive matrix polymer to provide a thermosetting polymer mixture adapted to cross-link upon adjusting the pH of said polymer mixture below about 7, whereby the blocked amine groups on said blocked ketimine polymer become unblocked and cross-link with said matrix polymer to provide a cured surface coating.

2. The process in claim 1 wherein the reactive matrix polymer is selected from an epoxy polymer, or a double bond polymer, or an isothiocyanate containing polymer.

3. The process in claim 1 wherein the ketimine ethylenically unsaturated monomer is produced by reacting a ketone or an aldehyde with an aliphatic amino compound to produce a ketimine, wherein said ketimine is further reacted with an ethylenically unsaturated acrylic, methacrylic or vinyl derivative containing reactive chains having a glycidyl, an epoxy, or an isocyanate group to produce said ketimine ethylenically unsaturated monomer.

4. The process in claim 1 wherein said ethylenically unsaturated monomers are selected from vinyl monomers, acrylate monomers, or methacrylate monomers.

5. The process in claim 1 wherein the coating composition is cured at a temperature not substantially above room temperature.

6. An aqueous coating composition produced in accordance with the process in claim 1 wherein the composition comprises on a weight basis, between 1% and 90% of said blocked ketimine polymer, and between 10% and 99% coreactive matrix polymer, wherein said blocked ketimine polymer is adapted to cross-link said matrix polymer upon lowering the pH of the composition to less than 7.

7. An aqueous coating composition adapted to cure at low temperature proximate to room temperatures, wherein the improvement comprises:

said coating composition containing a polymer mixture comprising on a weight basis, between 1% and 90% blocked ketimine polymer having blocked amine groups and between 10% and 99% coreactive matrix polymer, and said polymer mixture having a pH greater than about 7.2;

said blocked ketimine polymer being the reaction product of aliphatic amino compound reacted with an ethylenically unsaturated derivative containing reactive glycidyl groups, or epoxy groups, or isocyanate groups reacted with said aliphatic amino groups to produce a ketimine unsaturated monomer containing blocked amino groups, and said ketimine unsaturated monomer is coreacted with ethylenic monomers to produce an emulsion of blocked ketimine polymer containing blocked amino groups having a pH greater than 7.2;

said matrix polymer selected from an epoxy polymer, or a double bond polymer, or an isothiocyanate containing polymer, whereby said matrix polymer is adapted to be cross-linked by said blocked ketimine polymer upon lowering the pH of the coating composition to less than about 7.

* * * * *